(12) United States Patent
Hasunuma et al.

(10) Patent No.: US 11,919,164 B2
(45) Date of Patent: Mar. 5, 2024

(54) ROBOT SYSTEM AND ROBOT CONTROL METHOD

(71) Applicant: KAWASAKI JUKOGYO KABUSHIKI KAISHA, Kobe (JP)

(72) Inventors: Hitoshi Hasunuma, Kobe (JP); Jun Fujimori, Himeji (JP); Hiroki Kinoshita, Akashi (JP); Takeshi Yamamoto, Kobe (JP); Hiroki Takahashi, Akashi (JP); Kazuki Kurashima, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 387 days.

(21) Appl. No.: 17/059,099

(22) PCT Filed: May 24, 2019

(86) PCT No.: PCT/JP2019/020698
§ 371 (c)(1),
(2) Date: Nov. 25, 2020

(87) PCT Pub. No.: WO2019/225747
PCT Pub. Date: Nov. 28, 2019

(65) Prior Publication Data
US 2021/0220990 A1  Jul. 22, 2021

(30) Foreign Application Priority Data
May 25, 2018 (JP) ................................. 2018-100523

(51) Int. Cl.
*B25J 9/16* (2006.01)
*B25J 13/08* (2006.01)

(52) U.S. Cl.
CPC ............ *B25J 9/163* (2013.01); *B25J 9/1633* (2013.01); *B25J 9/1664* (2013.01); *B25J 9/1694* (2013.01); *B25J 13/088* (2013.01)

(58) Field of Classification Search
CPC ........ B25J 9/163; B25J 9/1633; B25J 9/1664; B25J 9/1694; B25J 13/088
See application file for complete search history.

(56) References Cited

U.S. PATENT DOCUMENTS 4,534,006 A * 8/1985 Minucciani ............... B25J 9/08
  700/249
10,493,624 B1 * 12/2019 Nabat .................. B62B 5/0073
(Continued)

FOREIGN PATENT DOCUMENTS

| JP | H07134605 A | 5/1995 |
| JP | 2014-128857 A | 7/2014 |

(Continued)

OTHER PUBLICATIONS

Pérez-Del-Pulgar et al., "Using Learning from Demonstration to Generate Real-Time Guidance for Haptic Shared Control," IEEE International Conference on Systems, Man, and Cybernetics, Oct. 9-12, 2016, Budapest, Hungary, pp. 003205-003210.
Aug. 20, 2019 International Search Report issued in International Patent Application No. PCT/JP2019/020698.

*Primary Examiner* — Jonathan L Sample
*Assistant Examiner* — Mohammed Yousef Abuelhawa
(74) *Attorney, Agent, or Firm* — Oliff PLC

(57) ABSTRACT

A robot system (1) includes the robot (10), a motion sensor (11), a surrounding environment sensor (12, 13), an operation apparatus (21), a learning control section (41), and a relay apparatus (30). The robot (10) performs work based on an operation command. The operation apparatus (21) detects and outputs an operator-operating force applied by the operator. The learning control section (41) outputs a calcu- (Continued)

lation operating force. The relay apparatus (30) outputs the operation command based on the operator-operating force and the calculation operating force. The learning control section (41) estimates and outputs the calculation operating force by using a model constructed by performing the machine learning of the operator-operating force, the surrounding environment data, the operation data, and the operation command based on the operation data and the surrounding environment data outputted by the sensors (11 to 13), and the operation command outputted by the relay apparatus (30).

11 Claims, 7 Drawing Sheets

(56) References Cited

U.S. PATENT DOCUMENTS

| | | | |
|---|---|---|---|
| 2016/0260027 A1 | 9/2016 | Kuwabara et al. | |
| 2017/0028553 A1* | 2/2017 | Tsuda | B25J 9/1653 |
| 2017/0305014 A1* | 10/2017 | Gildert | B25J 9/161 |
| 2018/0099407 A1* | 4/2018 | Nakamura | B25J 13/003 |
| 2018/0117758 A1* | 5/2018 | Wang | B25J 9/0081 |
| 2018/0257218 A1 | 9/2018 | Hashimoto et al. | |

FOREIGN PATENT DOCUMENTS

| | | |
|---|---|---|
| JP | 2016-159407 A | 9/2016 |
| KR | 10-2018-0019706 A | 2/2018 |

\* cited by examiner

ROBOT SYSTEM AND ROBOT CONTROL METHOD

TECHNICAL FIELD

The present invention relates mainly to a robot system to make a robot performing an operation based on a model constructed by a machine learning.

BACKGROUND ART

Conventionally, a desired movement is performed by controlling a control object such as a robot and a plant in previously generated program. For example, in PTL 1 discloses a configuration that includes a CPU which is a robot control section, a ROM in which a program for controlling the robot is stored, and a RAM in which a program written in a robot language for executing the operation of the robot.

CITATION LIST

Patent Literature

Patent Document 1: Japanese Unexamined Patent Publication No. H07-134605

SUMMARY OF INVENTION

Technical Problem

According to a conventional configuration, a program for operating a robot and the like is realized by a human understanding work that performs a programming how to operate. Unfortunately, such a method often takes a long time to create and adjust a program.

Because of that, in recent years, a robot operation control method using the machine learning has been proposed for the purpose of, reducing the creation time of program, and flexibly adapting the robot to various situations. With this robot operation control method, by providing the machine learning of a robot operation data to construct a model, and operate the robot based on the model.

Here, it is known that a robot system capable of operating a robot with an operation apparatus operated by the operator. It was not known that a suitable model in the case where a control section for performing the above-described robot operation control is provided in this type of robot system.

The present invention has been made in view of the circumstances described above, and a primary object of the present invention is to provide a configuration including a suitable model in a robot system that operates a robot according to a control section and an operation apparatus.

Solution to Problem

Problems to be solved by the present invention are as described above. Solutions to the problems and advantageous effects thereof will now be described.

A first aspect of the present invention provides a robot system configuration as follows. That is, this robot system includes a robot, a motion sensor, a surrounding environment sensor, an operation apparatus, a learning control section, and a relay apparatus. The robot performs work based on an operation command. The motion sensor detects an operation data indicating the motion of the robot. The surrounding environment sensor detects a surrounding environment data indicating the condition of the surrounding environment of the robot. The operation apparatus is an apparatus operated by the operator, and detects and outputs an operator-operating force, which is an operating force applied by the operator. The learning control section outputs a calculation operating force. The relay apparatus outputs the operation command based on the operator-operating force and the calculation operating force. The learning control section is estimated and output the calculation operating force by using a model constructed by providing the machine learning of the operator-operating force, the surrounding environment data, the operation data, and operation command based on the operation data outputted the motion sensor, the surrounding environment data outputted the surrounding environment sensor, and the operation command outputted the relay apparatus.

A second aspect of the present invention provides a robot control method as described below. That is, this robot control method controls a robot that performs work based on an operation command. This robot control method includes a motion detection process, an environment detection process, an operator-operating force detection process, a calculation operating force output process, and an operation command output process. In the motion detection process, an operation data indicating the motion of the robot is detected. In the environment detection process, a surrounding environment data indicating the condition of the surrounding environment of the robot is detected. In the calculation operating force output process, the calculation operating force is outputted. In the operation command output process, the operation command is outputted based on the operator-operating force and the calculation operating force. In the calculation operating force output process includes the process of estimating and outputting the calculation operating force by using a model constructed by providing the machine learning of the operator-operating force, the surrounding environment data, the operation data and operation command based on the detected operation data and surrounding environment data and the outputted operation command.

This allow to constitute a model such that the outputs of the learning control section and operation apparatus having a common form that is the operating force. Consequently, it is possible to share the process for converting the operator-operating force and the calculation operating force into the operation command to a robot.

Effect of the Invention

According to the present invention, the structure including a suitable model can be realized in a robot system which operates a robot depending on a control section and an operation apparatus.

DESCRIPTION OF EMBODIMENTS

Figure 1:
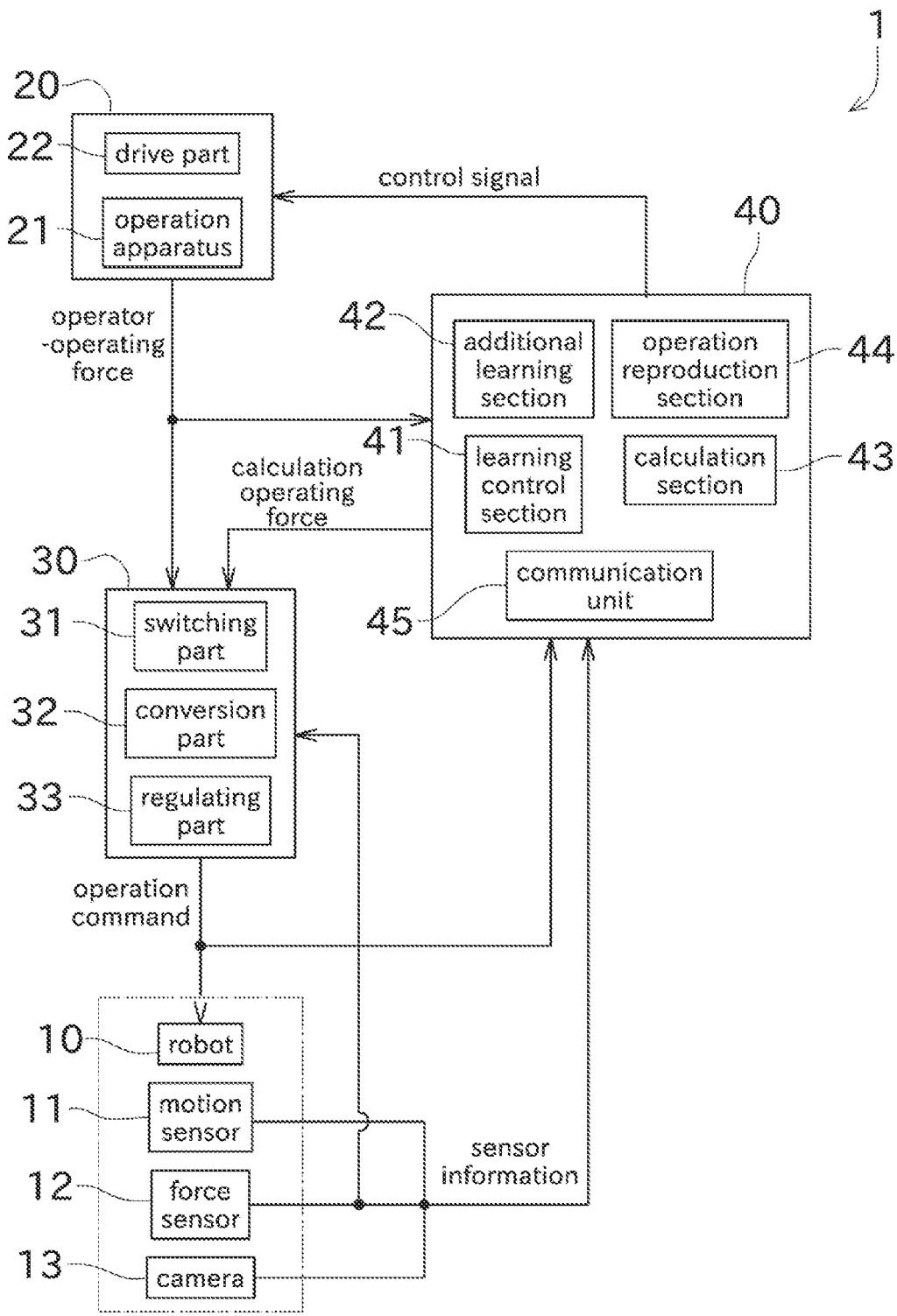
FIG. 1 A block diagram illustrating a robot system configuration according to an embodiment of the present invention.

Next, an embodiment of the present invention will now be described with reference to the drawings. First, a robot system 1 in this present embodiment will be described with referring to FIG. 1. FIG. 1 is a block diagram illustrating the configuration of the robot system 1.

A robot system 1 is a system that makes a robot 10 to perform work. As works performed by the robot 10 are various such as assembling, processing, painting, and washing for example. The robot 10 is controlled by using a model constructed in performing machine learning of an operation data relating to work. Therefore, in the robot system 1, the robot 10 is basically performed autonomously without the assistance of the operator. From such viewpoints, the autonomously operation of the robot 10 may be referred to as "autonomous operation". In addition, it can also perform work by moving the robot 10 according to the operator operation not only performs work autonomously of the robot 10. Further, the robot system 1 according to the present embodiment can performs work by cooperating the operation of the operator and the control of the system side.

As shown in FIG. 1, the robot system 1 includes the robot 10, a worker device 20, a relay apparatus 30, and a control section 40. The respective apparatus is connected to each other via a cable or a wireless network.

The robot 10 includes an arm portion mounted in pedestal. The arm portion having a plurality of joints, and each joint provided with an actuator. The robot 10 operates the arm portion by moving the actuator according to the operation command inputted from the outside. The operation command includes a linear velocity command and an angular velocity command. An end effector is mounted on the end of the arm portion according to the working contents. The robot 10 performs work by moving the end effector according to an operation command inputted from the outside.

Optionally, in the robot 10 or its surroundings, a sensor for detecting the operation of the robot 10 and the ambient environment and the like is mounted. In the present embodiment, a motion sensor 11, a force sensor 12, and a camera 13 are mounted in the robot 10. The motion sensor 11 is provided in the respective joint of the arm portion of the robot 10 and detects the rotation angle or angular velocity of the each joint (motion detection process). The force sensor 12 detects a force received by the robot 10 during operating the robot 10 (environment detection process). The force sensor 12 may be the configuration to detect the force received by the end effector, or further may be the configuration to detect the force received by each joint of the arm portion. Furthermore, the force sensor 12 may be the configuration to detect a moment, instead of or in addition, to a force. The camera 13 detects a work image that is an operation object (the progress of operation to the work) (environment detection process). The process conditions of the work can be detected based on the detection results of these sensors, by providing a sensor for detecting sound or vibration, instead of or in addition, to the camera 13. The data detected by the motion sensor 11 is an operation data indicating the motion of the robot 10, and the data detected by the force sensor 12 and the camera 13 is a surrounding environment data indicating the condition of the surrounding environment of the robot 10. In the following description, the motion sensor 11, the force sensor 12, and the camera 13 may be collectively referred to as "sensors 11 to 13.". Additionally, in the following description, the data detected by these sensors 11 to 13 may be particularly referred to as "the Sensor information".

The worker device 20 includes an operation apparatus 21 and a drive part 22. The operation apparatus 21 is a member that the operator operates to move the robot 10. The operation apparatus 21 is different according to the working contents, for example, a lever which is manually operated by the operator or a pedal which is operated by a foot. The operation apparatus 21 includes an operation force detection sensor (not shown). The operation force detection sensor detects an operation force applied by the operator to the operation apparatus 21 (the operation force detection process). When the operation apparatus 21 is configured to be movable in various directions, the operating force may be a value including the direction and magnitude of the force, which is a vector and the like. Additionally, the operation force is not only the force (N) applied by the operator but also may be an acceleration (that is, a value obtained by dividing the force applied by the operator by the mass of the operation apparatus 21) that is a value linked with a force. In the following description, the operation force applied by the operator to the operation apparatus 21 may be particularly referred to as "an operator-operating force". The operator-operating force detected and output by the operation apparatus 21 will be outputted to the robot 10 after being converted into an operation command by later-described relay apparatus 30. The drive part 22 includes an actuator (not shown). The actuator is configured such that the operation of the operation apparatus 21 can be freely performed by applying a force from outside to the operation apparatus 21 based on the inputted control signal. Especially, the actuator receives a control signal which applies a force to the operation apparatus 21 from later-described control section 40 (an operation reproduction section 44). It will be appreciated that with the drive part 22 may be provided outside the worker device 20.

Note that the robot system 1 may be the configuration in which one robot 10 allow to be operated by a plurality of worker devices 20. In this case, the operation object is different is conceivable, for example, one worker devices 20 operates the arm portion to operate the end effector by another worker device 20. Furthermore, a single worker device 20 may be the configuration in which a plurality of robots 10 can be operated. Under these conditions, it is preferable that the worker device 20 includes a selection unit for selecting the robot 10 to be operated, which is a key for example (not shown).

The control section 40 is configured by known computer, and including an arithmetic device (CPU or the like) and a storage unit (for example, ROM, RAM, HDD). The control section 40 can operate as various units to function so that the arithmetic device reads and executes the program stored in the storage unit. When assigned a name for each function, the control section 40 includes a learning control section 41, an additional learning section 42, a calculation section 43, an operation reproduction section 44, and a communication unit 45. The communication unit 45 having a connector or an antenna, and is configured to output an input from outside the control section 40 to each of the units 41 to 44 inside the control section 40. The communication unit 45 is configured to output the outputs from the units 41 to 44 inside the control section 40 to the outside the control section 40. Example of the input from the outside of the control section 40 receiving by the communication unit 45 included the operator-operating force output by the worker device 20, sensor information output by the sensors 11 to 13, and an operation command output by later-described relay apparatus 30. In addition, example of the output to the outside the control section 40 output by the communication unit 45 includes a calculation operating force output to later-described relay apparatus 30, an operation movement command output to later-described worker device 20 and an additional movement command. Hereinafter, for the input and output of the control section 40 by each of the units 41 to 44 inside the control section 40, may not specifically mentioned that via the communication unit 45.

The learning control section 41 outputs an operating force obtained from estimation by using a model constructed in performing machine learning. Below, a method of constructing this model will be made. This model is constructed by performing machine learning using data acquired when the operator operates the worker device 20 (the operation apparatus 21) by making a robot 10 to perform work. To be specific, as this data, the operator-operating force, the operation command, and the sensor information shown in FIG. 1 are included. The learning control section 41 is constructed a model of the learning control section 41 based on the operator-operating force, the operation command, and the sensor information (especially, the surrounding environment data) by the machine learning the correspondence relation between these data as described above. In addition, this model estimates and outputs an operation force to be output next based on an operation command and sensor information that are data other than the operator-operating force. In the following, the operation force estimated and output by the learning control section 41 is particularly referred to as a calculation operating force. These conditions, the learning control section 41 enables output an operation force that causes the robot 10 to appropriately perform work. It should be noted that the functions of the additional learning section 42, the calculation section 43, and the operation reproduction section 44 will be described later.

The operator-operating force outputted from the worker device 20 (the operation apparatus 21) and the calculation operating force calculated and output by the control section 40 are inputs into the relay apparatus 30. The relay apparatus 30 outputs an operation command for operating the robot 10 to the robot 10 and the control section 40 (the communication unit 45). The relay apparatus 30 includes known computer having the arithmetic device and the storage unit and the sensor. The relay apparatus 30 can operates as various units to function so that the arithmetic device reads and executes the program stored in the storage unit. When assigned a name for each function, the relay apparatus 30 includes a switching part 31, a conversion part 32, and a regulating part 33.

The switching part 31 is configured to output only the operator-operating force, or calculation operating force, or both the operator-operating force and the calculation operating force to the conversion part 32 from the inputted operator-operating force and calculation operating force. As a result, the operating states in which only the operator operates the robot 10, only the control section 40 operates the robot 10, and an operator and the control section 40 operates the robot 10 in cooperation with each other can be switched. For example, the switching part 31 may be configured to output only the other operation force when the sensor detects the operating force level which is 0. For instance, the above states may be configured so that the state changing switch for the operator to switch is provided in the worker device 20, or the relay apparatus 30 (switching part 31) detects the state of the state changing switch and then outputs of the switching part 31 to be changed.

The conversion part 32 converts and outputs the operation force (only the operator-operating force, or calculation operating force, or both the operator-operating force and the calculation operating force) inputted from the switching part 31 to the operation command for operating the robot 10. The learning control section 41 is used that the output operating command estimates a next calculation operating force or the like.

The regulating part 33 determines whether or not a predetermined operation restriction condition satisfies based on the force (output of the force sensor 12) received by the robot 10 and the operating force. The regulating part 33 performs control to stop the operation of the robot 10 when determining that the operation restriction condition is satisfied. For example, the regulating part 33 operates to stop the operation of the robot 10 by controlling to stop the operation command output by the conversion part 32 when the operating force as the output of the force sensor 12 and the input of the conversion part 32 satisfies the operation restriction condition. The details of the operation restriction condition will be described later.

Figure 2:
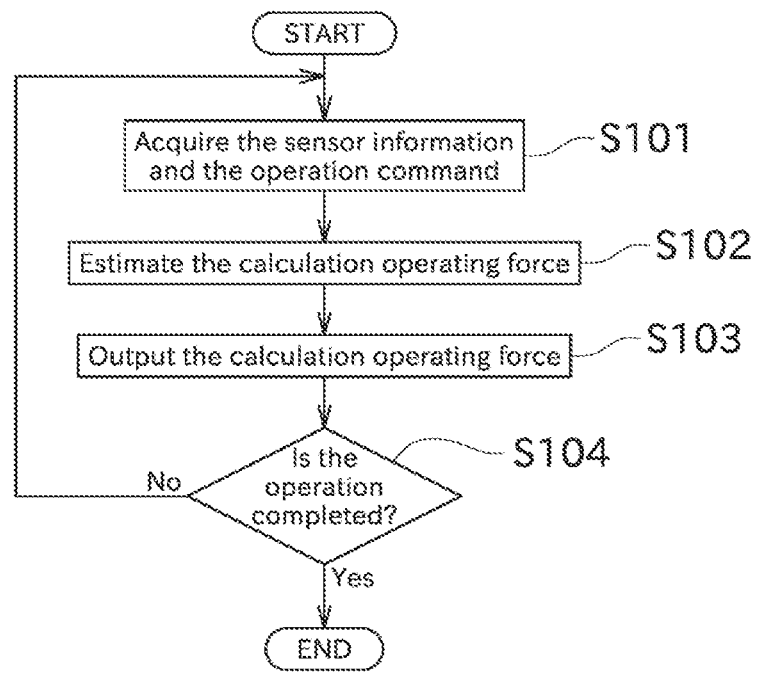
FIG. 2 A flowchart illustrating the processing of a learning control section performed using a model constructed by a machine learning.

And next, a process in performing the robot system 1 autonomously work will be described with referring to FIG. 2. FIG. 2 is a flowchart illustrating a process performed that by learning control section 41 using a model constructed by a machine learning.

The learning control section 41 acquires sensor information detected by the motion sensor 11, the force sensor 12 and the camera 13, and the operation command outputted by the relay apparatus 30 (the conversion part 32) (S101). The learning control section 41 inputs sensor information and an operation command to the constructed model as described above, and estimates a calculation operating force to be output next (S102). Then, the learning control section 41 outputs the estimated calculation operating force to the relay apparatus 30 (the conversion part 32) (S103, an output process of the calculation operating force). The relay apparatus 30 (the conversion part 32) converts the calculation operating force into an operation command and outputs the robot 10 to operate the robot 10. Accordingly, the robot 10 operates according to the calculation operating force outputted by the learning control section 41.

In addition, the learning control section 41 determines whether or not the operation has been completed (S104), and if the operation has not been completed, and performing the processes of S102 and S103 based on the newly acquired sensor information and operation command. The learning control section 41 performs a process necessary for the next operation after the end of control for the series of operating when it is determined that the operation has been completed (S104). For example, the learning control section 41 may be determines that the operation is completed when it is detected that the calculation operating force level output in any process is 0 with the result of repeating a predetermined number of times the processing of the processes of S101 to S103.

As described above, even when the operation force is adopted as the output of the learning control section 41, the robot system 1 can autonomously perform the work.

Figure 3:
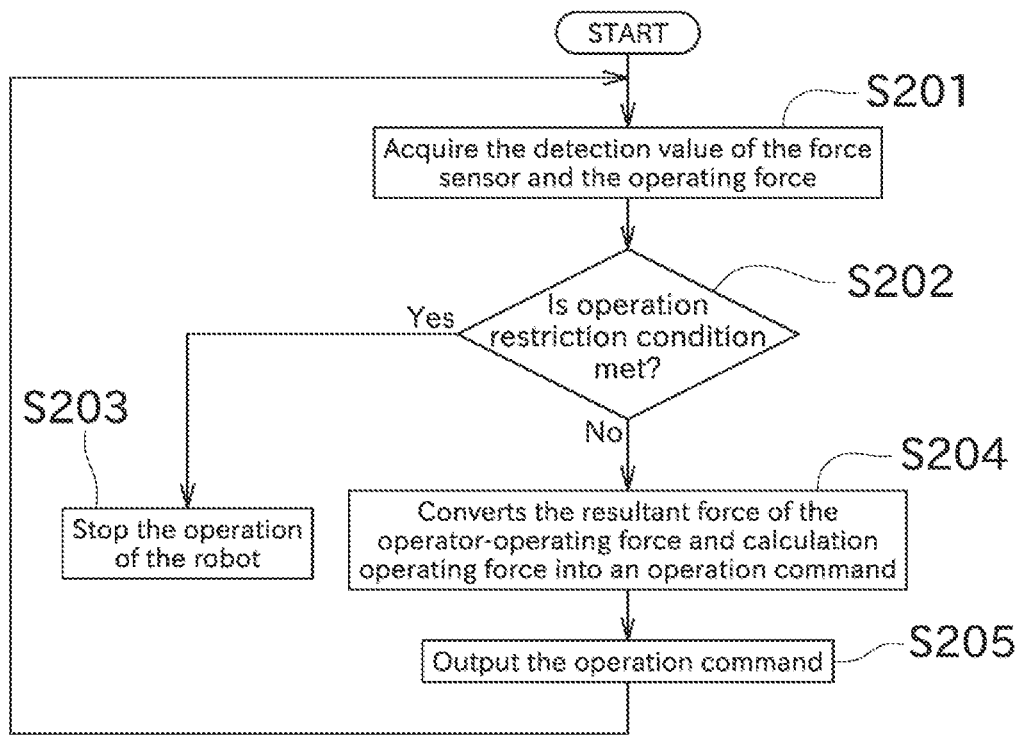
FIG. 3 A flowchart illustrating a regulation control and a conversion control performed by a relay apparatus.

Next, the control performed by the relay apparatus 30 will be described with referring to FIG. 3. FIG. 3 is a flowchart illustrating the regulation control performed by the regulating part 33 of the relay apparatus 30 and the conversion control performed by the conversion part 32.

The relay apparatus 30 acquires the detection value of the force sensor 12, the operator-operating force outputted by the worker device 20 (the operation apparatus 21) and the calculation operating force outputted by the control section 40 (the learning control section 41) (S201). When one alone of the worker devices 20 (the operation apparatus 21) and the control section 40 (the learning control section 41) is outputted the operation force, for example, if the relay apparatus 30 detects that the operating force level outputted in other one is 0, the relay apparatus 30 acquires only one of that operation force. In addition, the relay apparatus 30 may acquire both operation forces regardless of the operation force level thereof.

Next, the relay apparatus 30 (the regulating part 33) determines whether or not an operation restriction condition satisfies based on the detection value of the force sensor 12 and the acquired operation force (S202). The operation restriction condition is a condition which determines whether or not the robot 10 or the surrounding environment is under an unexpected condition. Examples of the operation restriction condition, the detection value of the force sensor 12 is equal to or upper than threshold value and the operator-operating force or the calculation operating force are equal to or more than a threshold, or even the detection value of the force sensor 12 is continue to increase, an instruction (the operation force) for operating the robot 10 in the same direction is continuously inputted. The operation restriction conditions mentioned here are only an example, and other conditions may be set. Moreover, the determination may be performed using data other than those described above. For example, it is possible to determine that the operation restriction condition is satisfied if a sound volume equal to or higher than a threshold is detected using a sound sensor that detects sound.

The regulating part 33 operates to stop the operation of the robot 10 when it is determined that the operation restriction conditions are satisfied (S203). For example, the regulating part 33 operates to stop the operation of the robot 10 by controlling to stop the operation command output by the conversion part 32 when it is determined that the operation restriction conditions are satisfied. It should be noted that a configuration in which another process is performed may be employed when the operation restriction conditions are satisfied. For example, a process for controlling the conversion part 32 may be performed in such a way as to output after reducing the process which controls the conversion part 32 so as to output the operation command that prohibits the operation of the robot 10 in a predetermined direction, and the converted operation command.

On the other hand, when the regulating part 33 determines that the operation restriction condition is not satisfied, the regulating part 33 controls the conversion part 32 and then convert the operation force into the operation command. The conversion part 32 acquires the resultant force of the operator-operating force and calculation operating force and converts the resultant force into an operation command of the robot 10 (S204), and outputs the converted operation command to the robot 10 and the control section 40 (S205, the operation command output process). It should be noted that when one alone of the operator-operating force and the calculation operating force is outputted the operation force to the conversion part 32, for example, if the conversion part 32 detects that the operating force level outputted in other one is 0, the conversion part 32 may convert the one operation force into an operation command to output it.

Therein, if the output of the control section 40 (the learning control section 41) is the position or speed of the robot 10, the output of the worker device 20 (the operation apparatus 21) is the operator-operating force, and the output formats of the control section 40, that is, the output dimension is different, the both outputs cannot be simply added or subtracted. In this point, in the present embodiment, the output (the operator-operating force) of the worker device 20 and the output (the calculation operating force) of the control section 40 have the same output formats, that is, the same output dimension. Consequently, the addition or subtraction of both outputs can be performed with simply and quickly. When operating the robot 10 using both the worker device 20 output and the control section 40 output, it is preferable that the two outputs may be added with a short time lag, which is a great advantage for the robot system 1.

In addition, in the present embodiment, even when the operator performs work while switching whether the worker device 20 operates the robot 10 or the control section 40 operates the robot 10, the output dimensions of the worker device 20 and the control section 40 are the same, so the conversion part 32 can have the contents of the conversion processing into the operation command will be the same. That is, even if the operation subject (that is, the worker device 20 or the control section 40) of the robot 10 is switched, the contents of the conversion processing of the conversion part 32 is not affected by that switching. This allows, the operation subject of the robot 10 can be switched smoothly.

Figure 4:
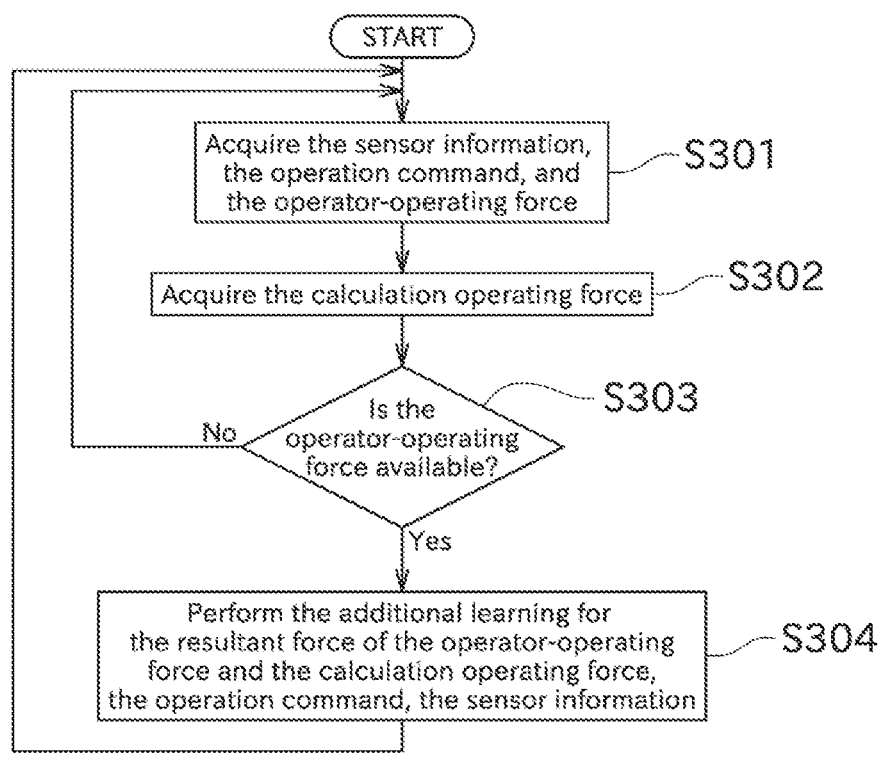
FIG. 4 A flowchart of an additional learning performed when an operator assists the robot control by a control section.

Next, a process performing additional learning in real time by assistant work for the operator will be described with referring to FIG. 4. FIG. 4 is a flowchart illustrating this processing.

The operator operates the worker device 20 (the operation apparatus 21) when finding a part to be improved while checking the motion of the robot 10 by the control section 40. The worker device 20 outputs the operator-operating force to the relay apparatus 30 and the control section 40. The relay apparatus 30 receives the calculation operating force from the control section 40 (the learning control section 41) and converts the total operation force of the calculation operating force and operator-operating force into the operation command to output to the robot 10 (and to the control section 40). And then, the operator can assist the operation of the robot 10 by the control section 40.

Additionally, the control section 40 performs additional learning based on the assistant work of the operator because of the assistant work by the operator is useful for improving the model. More specifically, the control section 40 acquires the sensor information, the operation command, and the operator-operating force outputted by the worker device 20 (S301).

Next, the additional learning section 42 acquires the calculation operating force output to the relay apparatus 30 from the learning control section 41 (S302). Thereafter, the additional learning section 42 determines whether or not the worker having an operator-operating force (that is, whether or not the worker has performed assistant work) (S303). In case the additional learning section 42 having an operator-operating force, for example, if it is detected that the operator-operating force level is 0, assume that the resultant force of the operator-operating force and calculation operating force is as a more appropriate operation force, operate an additional learning based on the resultant force, operation command, and the sensor information to update the model (S304). That is, in the situation showing by the sensor information acquired in step S301, the additional learning section 42 performs the additional learning to update the model so that the evaluation value of "the resultant force of the operator-operating force and calculation operating force" will be higher than the calculation operating force. Further, the additional learning section 42 performs such additional learning every time an assistant work is performed by the operator.

By repeating the above processing, it is possible to construct a more appropriate model. In this condition, the learning control section 41 can make the robot 10 to perform more appropriate work.

Note that instead of the processing in FIG. 4, for example, when the operator-operating force is detected in step S302, the robot 10 may be operated based on the output of only the worker device 20 (the operation apparatus 21). For example, when it is detected in step S302 that the operator-operating force level exceeds 0, the additional learning section 42 may not acquires the calculation operating force from the learning control section 41. In this case, in step S303, additional learning to updating the model is performed so that the evaluation value of the "the operator-operating force" will be high instead of "the resultant force of the operator-operating force and calculation operating force".

In addition, the additional learning may be performed after the robot system 1 is placed at the actual production site. Further, it may be performed in the level of learning before placing the robot system 1 in a production site. Furthermore, it may be also performed in the stage of the simulation which operates the robot 10 in the virtual space.

Figure 5:
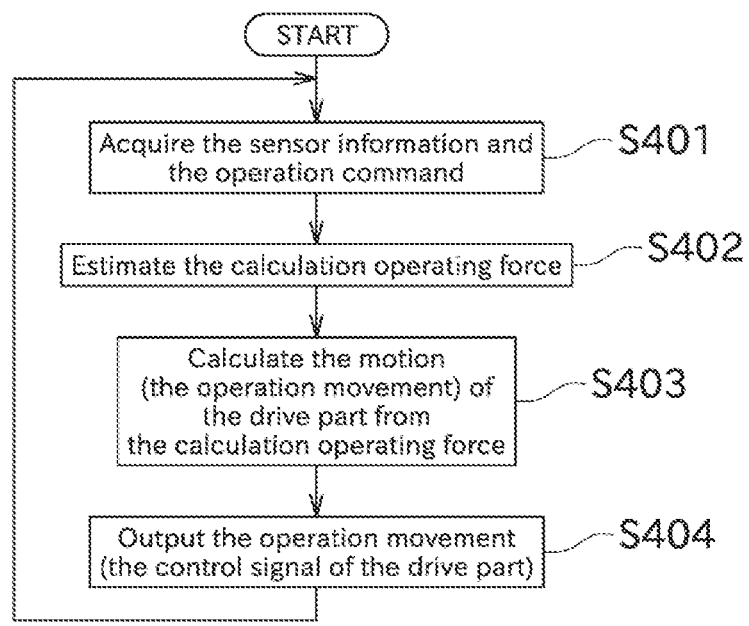
FIG. 5 A flowchart illustrating the processing in which the control section operates an operation apparatus to allow an operator to experience an operating method of the operation apparatus.
Figure 6:
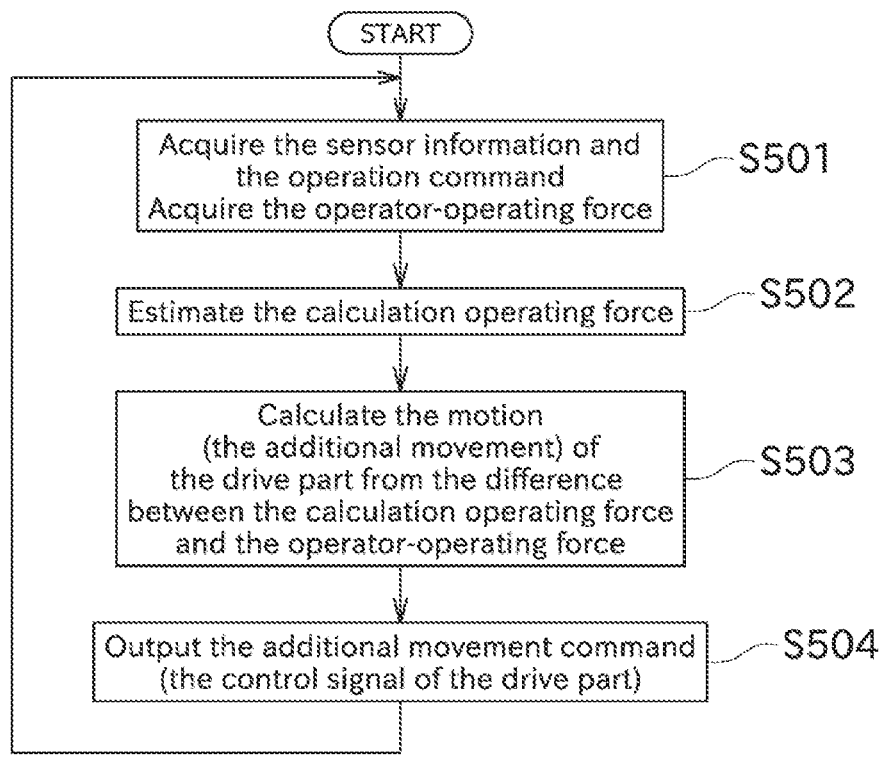
FIG. 6 A flowchart illustrating the processing in which the control section operates the operation apparatus to allow assists operation of an operator.

Next, a process in which the control section 40 educates an operator on an operation method of the worker device 20 will be described with reference to FIGS. 5 and 6.

It is useful to make an operator who has no operation experience of the worker device 20 (the operation apparatus 21) experience an appropriate operation of the worker device 20. In the present embodiment, the control section 40 reproduces an appropriate operation of the worker device 20 (the operation apparatus 21) to make an operator experience. Hereinafter, the processing flow in the case of performing this type of education will be described.

The control section 40 acquires the sensor information and the operation command which are necessary information same as the steps S101 and S102 (S401), and then inputs the sensor information and the operation command to the model to estimates the calculation operating force (S402).

Next, the control section 40 (the calculation section 43) calculates the operation movement indicating the motion of the drive part 22 so that the force applied from the outside to the operation apparatus 21 to be the same as the estimated calculation operating force by the drive part 22 (S403). In other words, how the worker device 20 (the operation apparatus 21) to operate, it is calculated whether or not the robot 10 to operate in the same manner as the control section 40. Here, by using a well-known machine control technique, it is possible to realize that the drive part 22 applies a force to the operation apparatus 21 as the same force applied by the operator to the operation apparatus 21 (the operator-operating force).

And next, the control section 40 (the operation reproduction section 44) outputs an operation movement command that is a control signal for moving the drive part 22, according to the operation movement calculated by the calculation section 43 (S404).

Accordingly, the operator can experience how to operate the worker device 20, for example, by only grasping with the hands the worker device 20 (the operation apparatus 21). In other words, it is possible to teach the skill that the control section 40 learned by the machine learning to the operator.

In addition, it is useful to make an operator who has operation experience of the worker device 20 (the operation apparatus 21) experience an operation to be improved of the worker device 20, and of that the improved operation. Hereinafter, the processing flow in the case of performing this type of education will be described.

The control section 40 acquires the sensor information and the operation command which are necessary information same as the steps S101 and S102 (S501), and then inputs the sensor information and the operation command to the model to estimates the calculation operating force (S502). However, to confirm the operation of the worker device 20 by the operator, further it is also acquired the operator-operating force in step S501.

Next, the control section 40 (the calculation section 43) detects a difference between the calculation operating force and the operator-operating force, and calculates the additional movements indicating the motion of the drive part 22, that the force applied from the outside to the operation apparatus 21 by the drive part 22 will be the above difference (S503). In other words, calculate that how can be operate the robot 10 in the same manner as the control section 40 if how the operation of operation apparatus 21 should be create by the operator. Here, by using a well-known machine control technique, it is possible to realize that the drive part 22 applies a force (a difference) to the operation apparatus 21. That is, by using a well-known machine control technique, it is possible to realize that the force applied to the operation apparatus 21 by the operator and drive part 22 is to be the same as the calculation operating force.

Next, the control section 40 (the operation reproduction section 44) outputs an additional movement command that is a control signal for moving the drive part 22, according to the additional movement calculated by the calculation section 43 (S504). Thereby, the operator can experience how to improve while checking himself/herself own operation.

The operation learning described with reference to FIGS. 5 and 6 may be implemented after the robot system 1 is placed at the actual production site. Further, it may be performed in the level of learning before placing the robot system 1 in a production site. In addition, it may be implemented using the simulation which operates the robot 10 in the virtual space.

An experienced operator of the worker device 20 (the operation apparatus 21) experiences a virtual operation of the worker device 20 during autonomous operation of the robot system 1, that is, it is useful to experience the control section 40 by the actual movements of the worker device 20 that the current operation of the learned robot 10 can be realized if the worker device 20 how to operate. Further, when the experienced operator determines that the current operation of the robot 10 during autonomous operation needs to be improved while experiencing the virtual operation of the worker device 20, it is more useful to perform that the control section 40 is additionally learned a more appropriate movements of the robot 10 by operating the worker device 20 while feeling the tactile and force transmitted to the worker device 20 by the operator. Hereinafter, the processing in the case of performing this type of the virtual operation and the additional learning will be described with reference to FIG. 7.

The control section 40 that acquires the sensor information and operation command to stores those (S601), and then inputs the sensor information and operation command to the model, and estimates the calculation operating force and stores those (S602).

Next, the control section 40 (the calculation section 43) calculates the operation movement indicating the motion of the drive part 22 that the force applied from the outside to the operation apparatus 21 will be the same as the estimated calculation operating force by the drive part 22 (S603). In other words, how the worker device 20 (the operation apparatus 21) to operate, it is calculated whether or not the robot 10 to operate in the same manner as the control section 40. Here, by using a well-known machine control technique, it is possible to realize that the drive part 22 to the operation apparatus 21 as the same force applied by the operator to the operation apparatus 21.

And next, the control section 40 (the operation reproduction section 44) outputs an operation movement command that is a control signal for moving the drive part 22, according to the operation movement calculated by the calculation section 43 (S604). Accordingly, the operator can experience the virtual operation of the worker device 20.

When the operator determines that the current operation of the robot 10 during autonomous operation needs to be improved while experiencing the virtual operation of the worker device 20, the operator operates the worker device 20 (the operation apparatus 21). The control section 40 acquires the operator-operating force outputted by the worker device 20 (the operation apparatus 21) (S605). Note that the operating force that performs an additional learning to the control section 40 to improve the operation of the robot 10 is the resultant force of the force (the calculation operating force) applied by the drive part 22 to the operation apparatus 21 and force (the operator-operating force) applied by the operator to the operation apparatus 21 itself.

Next, the additional learning section 42 determines whether there or not the operator-operating force is outputted from the worker device 20 (that is, whether or not the worker has operated the worker device 20) (S606). For example, it may determine by detecting whether or not the operator-operating force level exceeds 0. When it is determined that there is an operator-operating force, the additional learning section 42 calculates a resultant force of the operator-operating force and the calculation operating force stored in step S602 (S607), and then updates the model by performing additional learning based on the resultant force and the sensor information and operation command stored in step S602 (S608). Nonetheless, if there is no operator-operating force, returns to step S601 without performing additional learning by the additional learning section 42. Also, instead of steps S606 and S607, the additional learning section 42 may be determined whether or not the operator-operating force (that is, whether the difference between the resultant force and the operator-operating force is 0) after previously calculating the resultant force of the operation-operating force and the storage calculation operating force, by whether the resultant force is different from the operator-operating force.

Accordingly, the operator can experience the virtual operation of the worker device 20 during autonomous operation of the robot system 1. Furthermore, when the operator determines that the current operation of the robot 10 during autonomous operation needs to be improved, a more appropriate movements of the robot 10 can perform additional learning by the control section 40 by operating the worker device 20 while feeling the tactile and force transmitted to the worker device 20 by the operator. In other words, the operator can be easily performed the additional learning of the control section 40 so as to make further improve of that skills, while experiencing the skill that the control section 40 learned. Consequently, the experienced operator can easy to teach his/her own experienced skills to other operators via the control section 40.

Figure 7:
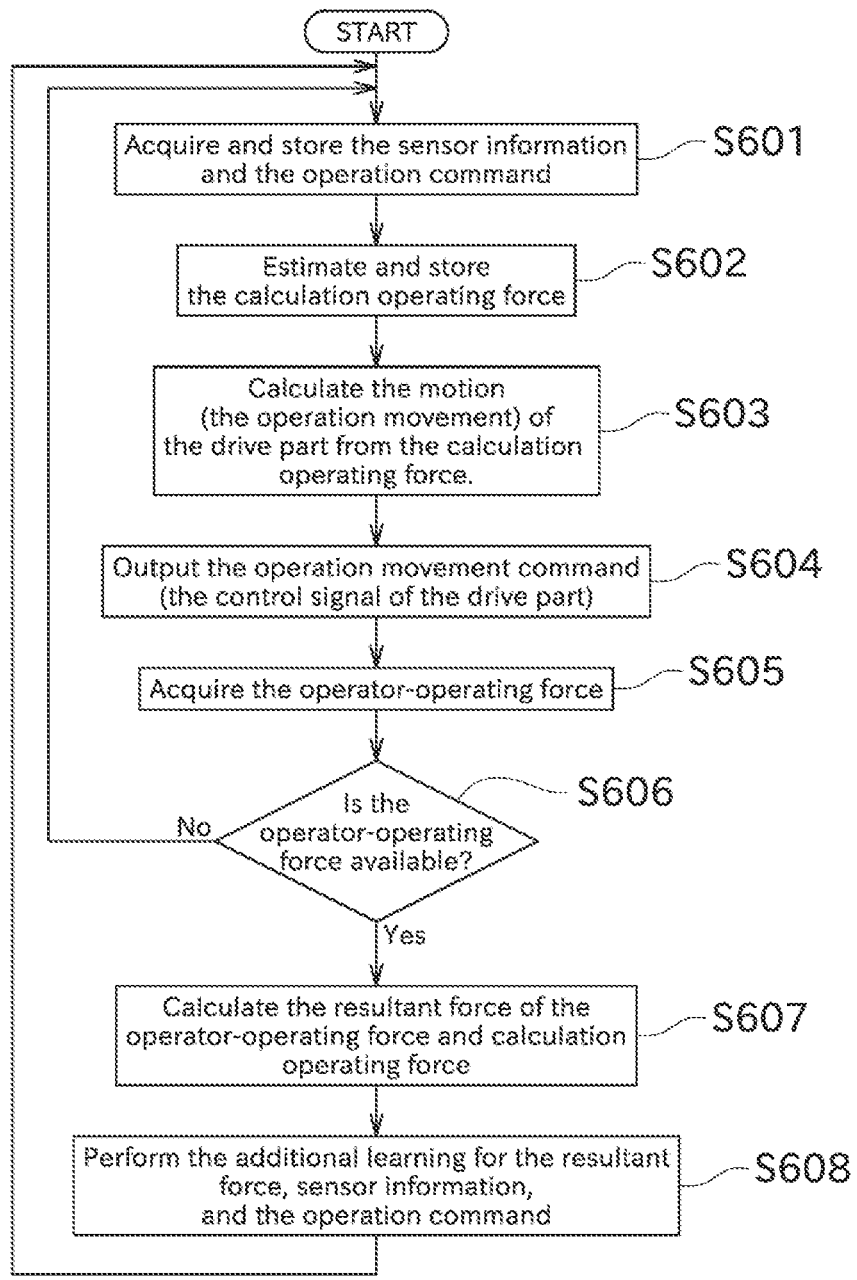
FIG. 7 A flowchart illustrating the processing of allowing an operator to experience the motion of the operation apparatus by the control section and additional learning the motion when an operator motioned the operation apparatus.

The operator's virtual operation experience and additional learning described with reference to FIG. 7 may be implemented after the robot system 1 is placed at the actual production site. In addition, it may be implemented in the level of learning before placing the robot system 1 in a production site. Moreover, it may be implemented using the simulation which operates the robot 10 in the virtual space.

Specifically, it is considered that in case the robot system 1 is configured so that the processes in FIGS. 2 to 7 can perform in real time (that is, extremely high speed and time lag can be ignored). In the case of this configuration, for the robot 10 under normal use, even if the repeating several times the process of FIG. 7, the change overtime is small, such as the sensor information, the operation command, and the calculation operating force acquired in steps S601 and S602. Therefore, instead of storing the sensor information, the operation command, and the calculation operating force in steps S601 and S602, the control section 40 (the additional learning section 42) may be acquired the sensor information, the operation command, and the calculation operating force from the communication unit 45 or the learning control section 41 when executing steps S607 and S608.

In addition, in the case of the above-described, the relay apparatus 30 may acquires the operator-operating force and the calculation operating force from the worker device 20 and the controller 40 as necessary and output the operation command. These conditions, while performing the additional learning of motion of the improved robot 10 by robot system 1, of that operation can reflect as the actual operation of the robot 10 in real time. In other words, the operator can perform the improved work of the robot 10 while viewing the live operation of the improved robot 10.

As described above, the robot system 1 includes the robot 10, the motion sensor 11, the surrounding environment sensor (the force sensor 12, the camera 13), the operation apparatus 21, the learning control section 41, and the relay apparatus 30. The robot 10 performs work based on the operation command. The motion sensor 11 detects an operation data indicating the motion of the robot 10. The surrounding environment sensor (the force sensor 12 and the camera 13) detects the surrounding environment data indicating the condition of the surrounding environment of the robot 10. The operation apparatus 21 is an apparatus operated by the operator, and detects and outputs an operator-operating force, which is an operating force applied by the operator. The learning control section 41 outputs the calculation operating force. The relay apparatus 30 outputs the operation command based on the operator-operating force and the calculation operating force. The learning control section 41 is estimated and output the calculation operating force by using a model constructed by providing the machine learning of the operator-operating force, the surrounding environment data, the operation data, and operation command based on the operation data and the surrounding environment data outputted the sensors 11 to 13, and the operation command outputted the relay apparatus 30.

This allow to constitute a model such that the outputs of the learning control section 41 and worker device 20 having a common form that is the operating force. Consequently, it is possible to share the process for converting the operator-operating force and the calculation operating force into the operation command to a robot.

In the robot system 1 of the present embodiment, the relay apparatus 30 calculates the resultant force of the operator-operating force and calculation operating force, and converts and outputs the resultant force into an operation command.

This makes it possible to construct a system in which the worker assists the work of the robot 10, or the robot 10 assists the work of the worker.

Furthermore, the robot system 1 of the present embodiment includes the additional learning section 42. The additional learning section 42 updates the model by performing additional learning based on the resultant force of the operator-operating force and calculation operating force, the surrounding environment data, the operation data, and the operation command.

In addition, the robot system 1 according to the embodiment includes the additional learning section 42. The additional learning section 42 updates the model by performing additional learning based on the operator-operating force, the surrounding environment data, the operation data, and the operation command.

This allows the operator corrects the motion of the robot 10 using the operation apparatus 21 and performs additional learning the corrected operation thereof.

Further, the robot system 1 of the present embodiment includes the drive part 22, the calculation section 43, and the operation reproduction section 44. The drive part 22 applies a force to the operation apparatus 21 based on the control signal. The calculation section 43 calculates the operation movement indicating the motion of the drive part 22 so that the force applied to the operation apparatus 21 by the drive part 22 to be the same as the calculation operating force. The operation reproduction section 44 outputs a control signal based on the operation movement.

This enables, it is possible to teach the suitable operation method of the robot 10 to the operator.

The robot system 1 of the present embodiment includes the drive part 22, the calculation section 43, and the operation reproduction section 44. The drive part 22 applies a force to the operation apparatus 21 based on the control signal. The calculation section 43 calculates the additional movements indicating the motion of the drive part 22, that the force applied to the operation apparatus 21 by the drive part 22 will be the difference between the calculation operating force and the operator-operating force. The operation reproduction section 44 outputs a control signal based on the additional movements.

Accordingly, the operator can experience own improvement point of the operation of robot 10.

Further, the robot system 1 of the present embodiment includes the drive part 22, the calculation section 43, and the operation reproduction section 44. The drive part 22 applies a force to the operation apparatus 21 based on the control signal. The calculation section 43 calculates the operation movement indicating the motion of the drive part so that the force applied to the operation apparatus 21 by the drive part 22 to be the same as the calculation operating force. The operation reproduction section 44 outputs a control signal based on the operation movement. When the operator-operating force level is not 0, the additional learning section 42 updates the model by performing additional learning based on the resultant force of the operator-operating force and calculation operating force, the surrounding environment data, the operation data, and the operation command.

This allows the operator can easily operates the additional learning a more appropriate operation of the robot 10, while experiencing the learning operation of the robot 10.

In addition, in the robot system 1 of the present embodiment, the surrounding environment sensor includes the force sensor 12 that detects a force received by the robot 10 as surrounding environment data Thus, for example, it is possible to operate the robot 10 in consideration of the force received from the work.

Further, in the robot system 1 of the present embodiment, the relay apparatus 30 outputs the operation command regulating the movement of robot 10 when the predetermined condition (the operation restriction condition) is met based on the detection value of force sensor 12 and the operating force.

Accordingly, the operations of the robot 10 can be restricted with in an unexpected situation.

While a preferred embodiment and variations of the present invention have been described above, the above configurations may be modified, for example, as follows.

The contents of the flowcharts in FIGS. 2 to 7 are an example, an additional processing, an omission processing, and the processing order change may be performed.

The data described in the above embodiment is an example as the data input for constructing a model and the data input for estimating the operating force, and a different data may be inputted.

In the above-described embodiment, if there are a plurality of worker devices 20, in performing the additional learning for example, an assistant work may be configured to share such that one worker device 20 performs an assistant work for the arm portion and another worker device 20 performs assistant work for an end effector. In addition, when educating operators by the method shown in FIG. 5, the same operation movement command is outputted from the control section 40 to the plurality of worker devices 20 (the drive part 22), so that the plurality of operators may be experienced an appropriate operation of the worker device 20.

In the above-described embodiment, it is assumed that the apparatus constituting the robot system 1 are placed at the same work site, but if the information can communicate on the network, at least one apparatus (for example, the worker device 20) may be placed at a remote place. Further, at least a part of the function included in the relay apparatus 30 may be the configuration performing in the control section 40. Conversely, at least a part of the functions included in the control section 40 may be the configuration performing in the relay apparatus 30. Furthermore, it may be the configuration including other hardware other than the relay apparatus 30 and the control section 40.

In the above-described embodiment, the robot 10 is mounted on the pedestal part, but may be the configuration that allows autonomous traveling. Also, the robot 10 may be the configuration performing work using members other than the arm portion.

REFERENCE SIGNS LIST 1. robot system
10. robot
11. motion sensor
12. force sensor
13. camera
20. worker device 30. relay apparatus
40. control section
41. learning control section
42. additional learning section
43. calculation section
44. operation reproduction section

The invention claimed is:

1. A robot system which performs work based on an operation command comprising:
   a motion sensor which detects an operation data indicating motion of the robot;
   a surrounding environment sensor which detects a surrounding environment data indicating condition of surrounding environment of the robot;
   an operation apparatus which is operated by an operator, and the operation apparatus detecting and outputting an operator-operating force which is an operating force applied by an operator;
   a controller configured to output a calculation operating force; and
   a relay apparatus which outputs the operation command based on the operator-operating force and the calculation operating force; wherein
   the controller is configured to estimate and output the calculation operating force based on a model, the operation data detected by the motion sensor, the surrounding environment data detected by the surrounding environment sensor, and the operation command outputted from the relay apparatus, the model being constructed by performing a machine learning of the operator-operating force, the surrounding environment data, the operation data and the operation command.

2. The robot system according to claim 1, wherein the relay apparatus calculates a resultant force of the operator-operating force and the calculation operating force and the relay apparatus converts and outputs the resultant force into the operation command.

3. The robot system according to claim 1, wherein the controller is further configured to update the model by performing additional learning based on a resultant force of the operator-operating force and the calculation operating force, the surrounding environment data, the operation data, and the operation command.

4. The robot system according to claim 1, wherein the controller is further configured to update the model by performing additional learning based on the operator-operating force, the surrounding environment data, the operation data, and the operation command.

5. The robot system according to claim 1, further comprising:
   an actuator which applies a force to the operation apparatus based on a control signal;
   wherein the controller is further configured to calculate an operation movement indicating motion of the actuator so that the force applied to the operation apparatus by the actuator to be the same as the calculation operating force; and
   the controller is further configured to output the control signal based on the operation movement.

6. The robot system according to claim 1, further comprising:
   an actuator which applies a force to the operation apparatus based on a control signal;
   the controller is further configured to calculate an additional movement indicating a motion of the actuator so that the force applied to the operation apparatus by the actuator will be a difference force between the calculation operating force and the operator-operating force; and
   the controller is further configured to output the control signal based on the additional movements.

7. The robot system according to claim 3, further comprising:
   an actuator which applies a force to the operation apparatus based on a control signal;
   the controller is further configured to calculate an operation movement indicating the motion of the actuator so that the force applied to the operation apparatus by the actuator to be the same as the calculation operating force; and
   the controller is further configured to output the control signal based on the operation movement;
   wherein when the operator-operating force is not 0, the controller updates the model by performing additional learning based on the resultant force of the operator-operating force and the calculation operating force, the surrounding environment data, the operation data, and the operation command.

8. The robot system according to claim 1, wherein the surrounding environment sensor including a force sensor that detects a force received by the robot as the surrounding environment data.

9. The robot system according to claim 8, wherein the relay apparatus outputs the operation command regulating the movement of the robot when a predetermined condition based on a detection value of the force sensor and the operating force is met.

10. A method of controlling a robot which performs work based on an operation command comprising:
    a motion detection process which detects an operation data indicating a motion of the robot;
    an environment detection process which detects a surrounding environment data indicating condition of surrounding environment of the robot;
    an operator-operating force detection process which detects an operator-operating force that is an operating force applied to an operation apparatus by the operator;
    a calculation operating force output process which outputs a calculation operating force; and
    an operation command output process which outputs the operation command based on the operator-operating force and the calculation operating force,
    wherein
    the calculation operating force output process which estimates and outputs the calculation operating force based on a model, the detected operation data, the detected surrounding environment data, and the outputted operation command, the model being constructed by performing a machine learning of the operator-operating force, the surrounding environment data, the operation data, and the operation command.

11. The robot system according to claim 1, wherein the controller is configured to estimate and output the calculation operating force by using the model, the controller inputting the surrounding environment data, the operation data, and the operation command into the model, and the model outputting the calculation operating force.

* * * * *